(12) United States Patent
Barker et al.

(10) Patent No.: US 7,901,810 B2
(45) Date of Patent: Mar. 8, 2011

(54) BATTERY ACTIVE MATERIALS AND METHODS FOR SYNTHESIS

(75) Inventors: Jeremy Barker, Oxfordshire (GB); M. Yazid Saidi, Henderson, NV (US); Jeffrey Swoyer, Henderson, NV (US)

(73) Assignee: Valence Technology, Inc., Las Vegas, NV (US)

( * ) Notice: Subject to any disclaimer, the term of this patent is extended or adjusted under 35 U.S.C. 154(b) by 1923 days.

(21) Appl. No.: 10/848,452

(22) Filed: May 17, 2004

(65) Prior Publication Data

US 2004/0262571 A1 Dec. 30, 2004

Related U.S. Application Data

(60) Provisional application No. 60/486,541, filed on Jun. 3, 2003.

(51) Int. Cl.
  H01M 4/58 (2010.01)
  H01M 4/88 (2010.01)
  H01M 4/00 (2010.01)

(52) U.S. Cl. ............... 429/231.9; 429/231.95; 429/231.5; 429/221; 429/224; 429/223; 423/306; 423/518; 252/182.1

(58) Field of Classification Search ............... 429/231.9, 429/231.95, 231.5, 221, 224, 223; 252/182.1; 423/306, 518
See application file for complete search history.

(56) References Cited

U.S. PATENT DOCUMENTS

| 2002/0106564 A1* | 8/2002 | Okawa et al. ............... 429/221 |
| 2002/0124386 A1* | 9/2002 | Hosoya et al. ............... 29/623.1 |

OTHER PUBLICATIONS

Gaubicher et al., Li/-VOPO4: A new 4 V System for Lithium Batteries, 1999, Journal of the Electrochemical Society, 146 (12), pp. 4375-4379.*
Lii et al., Synthesis and structural characterizaion of sodium vanadyl (IV) orthophosphate NaVOPO4, 1991, Valence Technology, 197, pp. 67-73.*
Pozas et al., "Lithium insertion in vanadyl phosphate," Solid State Ionics, Elsevier Science Publishers, 1992, 51, pp. 79-83.*

Pozas et al., "Lithium Insertion in Vanadyl Phosphate," Solid State Ionics, (1992), 51, pp. 79-83, Elsevier Science Publishers, North-Holland.
Zima et al., "Intercalation of VOPO4 2H2O with Lithium Ions," Abstract Solid State Ion. Diffus. React., (1994), 67, pp. 277-280, Netherlands.
Zima et al., "Intercalation of Alkali Metal Ions into layered VOPO4 2H2O," Abstract Molecular Crystals and Liquid Crystals Science and Technology, (1994), V 244pp. 121-126.
Chauvel et al., "Redox Intercalation of Alkali Metals into Vanadyl Phosphate Dihydrate," Abstracts Materials Chemistry and Physics, (1995), 40, pp. 207-211.
Kwang-Hwa Lii, "Structural Chemistry of A(VOPO4)2 nH2O," Journal of the Chinese Chemical Society, (1992), 39, pp. 569-576.
Gaubicher et al., "Li/beta-VOPO4: A New 4V System for Lithium Batteries," Journal of the Electrochemical Society, (1999), 146(12), pp. 4375-4379.
Lii et al., "Synthesis and structural characterization of sodium vandeyl(IV) orthophosphate NaVOPO4," Zeitschrift fur Kristallographie, (1991), 197, pp. 67-73; Oldenbourg Verl.

* cited by examiner

Primary Examiner — Dah-Wei Yuan
Assistant Examiner — Angela J. Martin
(74) Attorney, Agent, or Firm — Cynthia S. Kovacevic; Roger A. Williams; Brian T. Mangum

(57) ABSTRACT

Active materials for rechargeable batteries have a general formula $$A_a(MO)_b M'_c XO_4$$

where A represents an alkali metal or mixture of alkali metals, a is greater than about 0.1 and less than or equal to about 2; MO is an ion containing a transition metal M not in its highest oxidation state, M' represents a metal, or mixture of metals, and b is greater than 0 and less than or equal to about 1, c is less than 1 wherein a, b and c are selected so as to maintain the electroneutrality of the compound, and X is phosphorus, arsenic, or sulfur, or mixtures thereof. Preferred active materials are alkali metal vanadyl metal phosphates of general formula $A_a(VO)_b M'_c PO_4$ where a and b are both greater than 0 and c may be zero or greater. New synthetic routes are provided to alkali metal mixed metal phosphates where at least one of the starting materials is a metal-oxo group $(MO)^{3+}$, where M represents a metal in a +5 oxidation state. Reductive methods are provided for reacting a metal-oxo phosphate with an alkali metal compound in the presence of reducing carbon. The carbothermal reduction step can for example result in the reduction of a +5 metal to a +4 state or lower.

8 Claims, 5 Drawing Sheets

Cell#002060 LiVOPO$_4$ C/50 rate 21.1 mg active

Cell#002090 LiVOPO$_4$ EVS 24.0 mg active

Cell#002090 LiVOPO$_4$ EVS 24.0 mg active

LiVOPO$_4$ (1S1530B1) vs Li, 23C, C/15 Rate

LiVOPO$_4$ (1S1530B1) vs Li, 23C, C/15 Rate

Cell#002066 Li(VO)$_{0.75}$ Mn$_{0.25}$ PO$_4$ C/10 rate 17.0 mg active

Cell#003068 NaVOPO$_4$ (600° C/30mins) C/10 rate 24.3 mg active

Cell#003069 NaVOPO$_4$ (700°C/30mins) C/10 rate 24.3 mg active

Cell#003088 NaVOPO$_4$ (700°C/30mins) EVS 17.1 mg active

Cell#003088 NaVOPO$_4$ (700°C/30mins) EVS 17.1 active

BATTERY ACTIVE MATERIALS AND METHODS FOR SYNTHESIS

This application claims priority under 35 U.S.C. §119(e) to U.S. Provisional application Ser. No. 60/486,541 filed Jun. 3, 2003.

FIELD OF THE INVENTION

The invention relates to electrochemically active materials for use in rechargeable batteries. The invention further relates to reductive methods for synthesis of transition metal compounds.

BACKGROUND OF THE INVENTION

With the increasing market penetration of portable electronic devices such as telephones, computers, and digital assistants, there has been a corresponding increase in the need for and requirements of batteries to power the devices. In particular, the market demands that the batteries be economical, flexible in application, and rechargeable. Lithium ion batteries have become popular as rechargeable batteries in this market.

Batteries can generally be described as comprising three components: an anode that contains a material that is oxidized (yields electrons) during discharge of the battery (i.e., while it is providing power); a cathode that contains a material that is reduced (accepts electrons) during discharge of the battery; and an electrolyte that provides for transfer of ions between the cathode and anode. During discharge, the anode is the negative pole of the battery and the cathode is the positive pole. Batteries can be more specifically characterized by the specific materials that make up each of these three components. Selection of these components can yield batteries having specific voltage and discharge characteristics that can be optimized for particular applications.

Batteries can also be generally categorized as being "primary," where the electrochemical reaction is essentially irreversible, so that the battery becomes unusable once discharged; and "secondary," where the electrochemical reaction is, at least in part, reversible so that the battery can be recharged and used more than once. Secondary batteries are increasingly used in many applications, because of their convenience, reduced cost, and environmental benefits.

There are a variety of secondary battery systems known in the art. Among such systems are lead-acid, nickel-cadmium, nickel-zinc, nickel-iron, silver oxide, nickel metal hydride, rechargeable zinc-manganese dioxide, zinc-bromide, and lithium and lithium ion batteries. Systems containing lithium and sodium afford many potential benefits, because these metals are light in weight, while possessing high standard potentials. For a variety of reasons, lithium batteries are, in particular, commercially attractive because of their high energy density, higher cell voltages and long shelf-life.

Lithium batteries are prepared from one or more electrochemical cells containing electrochemically active (electroactive) materials. Among such batteries are those having metallic lithium anodes and metal chalcogenide (oxide cathodes, typically referred to as "lithium metal" batteries. The electrolyte typically comprises a salt of lithium dissolved in one or more solvents, typically non aqueous aprotic organic solvents. Other electrolytes are solid electrolytes (typically polymeric matrixes) that contain an ionic conductive medium (typically a lithium containing salt in organic solvents) in combination with a polymer that itself may be ionically conductive but electrically insulating.

Cells having metallic lithium anode and metal chalcogenide cathode are charged in an initial condition. During discharge, lithium metal yields electrons to an electrical circuit at the anode. Positively charged ions are created that pass through the electrolyte to the electrochemically active (electroactive) material of the cathode. The electrons from the anode pass through the external circuit, powering the device, and return to the cathode.

Another lithium battery uses an "insertion anode" rather than lithium metal, and is typically referred to as a "lithium ion" battery. Insertion or intercalation electrodes contain materials having a lattice structure into which an ion can be inserted and subsequently extracted. Rather than chemically altering the intercalation material, the ions slightly expand the internal lattice lengths of the compound without extensive bond breakage or atomic reorganization. Insertion anodes contain, for example, lithium metal chalcogenide, lithium metal oxide or carbon materials such as coke and graphite. These negative electrodes are used with lithium-containing insertion cathodes. In their initial condition, the cells are not charged, since the anode does not contain a source of cations. Thus, before use, such cells must be charged in order to transfer cations (lithium) to the anode from the cathode. During discharge the lithium is then transferred from the anode back to the cathode. During subsequent recharge, the lithium is again transferred back to the anode where it reinserts. This back-and-forth transport of lithium ions ($Li^+$) between the anode and cathode during charge and discharge cycles has led to these cells as being called "rocking chair" batteries.

Electrochemically active materials for the cathodes of such batteries must be economical, easy to manufacture, and capable of reversibly being oxidized and reduced during the charge-discharge cycles. Commonly used active materials include lithium transition metal oxides such as $LiCoO_2$, $LiNiO_2$, and $LiMn_2O_4$. These materials all have drawbacks, including expense, difficulty of manufacture, and loss of battery capacity on cycling. There is a constant search in the industry for new active materials with improved properties, and for methods for synthesizing the active materials.

Gaubicher and coworkers (see, for example, J. Electrochem. Soc. 146, 4375 (1999), Electrochem. Solid State Lett. 3, 460, (2000)) have described electrochemical and chemical lithium insertion into chemical species such as $VOXO_4$, where X can be sulfur, phosphorus or arsenic. Lithium is inserted electrochemically by providing the $VOXO_4$ material in an electrochemical cell opposite a lithium counter-electrode. Upon discharge, the lithium ions are inserted into the $VOXO_4$, with concomitant reduction of the vanadium species. In the chemical insertion reaction, a solution of lithium iodide is reacted with $VOPO_4$, producing a material stoichiometrically equivalent to $Li_xVOPO_4$. Lii and coworkers (see, for example, J. Chinese Chem. Soc. 39, 569 (1992), Zeit. Kristall. 197, 67 (1991)) have reported on the properties and synthesis of sodium vanadyl phosphate, prepared using both solid state and hydrothermal methods.

It would be desirable to provide improved methods for synthesis of vanadyl materials. It would further be desirable to develop reductive methods that produce active materials intimately mixed with conductive carbon material for direct use in fabricating electrodes for electrochemical cells. Further, it would be desirable to develop new vanadyl materials for use as electrochemical active materials and rechargeable batteries.

SUMMARY OF THE INVENTION

In one aspect, the metal phosphates are useful as electrochemical active materials in rechargeable batteries. Active materials of general formula

$Li_aNa_{a'}(MO)_bM'_{1-b}PO_4$ wherein the sum of a and a' is greater than 0 and less than or equal to 2, can be incorporated into an electrode; the active material reversibly de-inserts and re-inserts lithium or sodium cations during charge and discharge of the battery.

BRIEF DESCRIPTION OF THE DRAWINGS

The present invention will become more fully understood from the detailed description and the accompanying drawings, wherein.

DETAILED DESCRIPTION OF THE INVENTION

Figure 1:
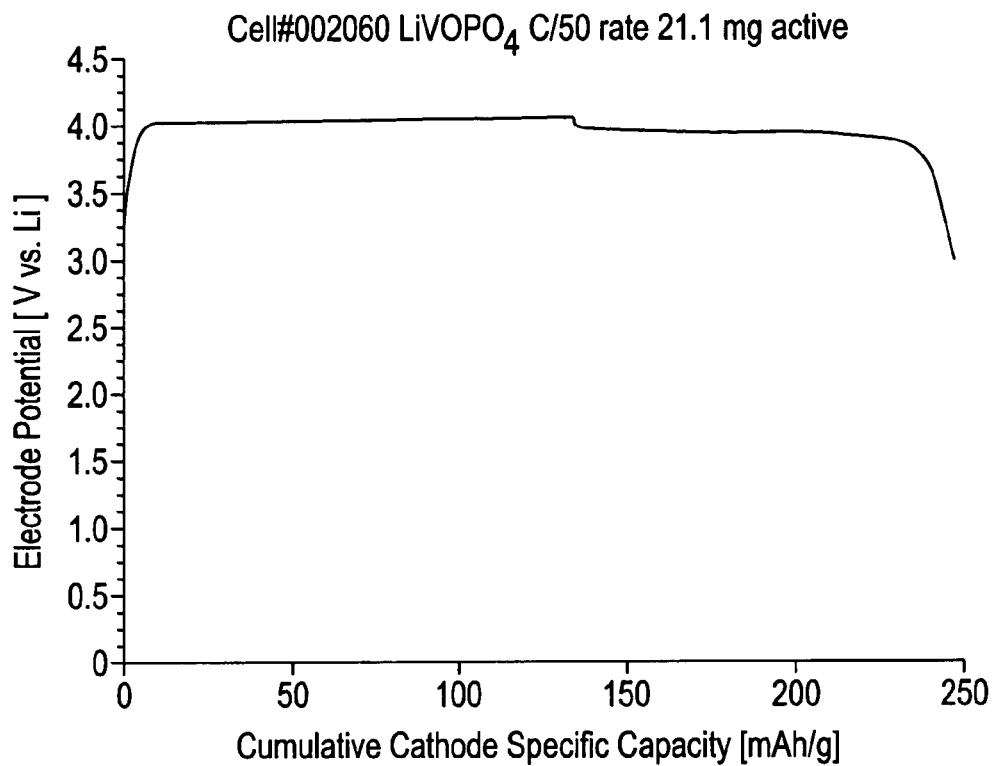
FIG. 1 shows the first cycle constant current data of LiVOPO$_4$ material.

The following description of the invention is merely exemplary in nature and is in no way intended to limit the invention, its application, or uses.

Active materials for rechargeable batteries have a general formula $$A_a(MO)_bM'_cXO_4$$

where A represents an alkali metal or mixture of alkali metals, a is greater than about 0.1 and less than or equal to about 2; MO is an ion containing a transition metal M not in its highest oxidation state, M' represents a metal, or mixture of metals, and b is greater than 0 and less than or equal to about 1, c is less than 1, and X is phosphorus, arsenic, sulfur, silicon, or combinations of them. In a preferred embodiment, X comprises phosphorus. The subscripts a, b, and c, as well as the composition and oxidation states of metal or mixture of metal M' in the formulas herein are chosen so as to achieve electroneutrality of the active materials represented by the formulas. It is to be understood that as used herein the terms "highest oxidation state" or "higher oxidation state" refer to integer and non-integer oxidations states.

In one embodiment the active materials for rechargeable batteries have a general formula $$A_a(MO)_bM'_cXO_4$$

where A represents an alkali metal or mixture of alkali metals, a is greater than about 0.1 and less than or equal to about 2; MO is a +2 ion containing a metal M in a +4 oxidation state, M' represents a +3 metal, or mixture of metals, and b is greater than 0 and less than or equal to about 1, c is less than 1, and X is phosphorus, arsenic, sulfur, silicon, or combinations of them. In a preferred embodiment, X comprises phosphorus. The subscripts a, b, and c, as well as the composition and oxidation states of metal or mixture of metal M' in the formulas herein are chosen so as to achieve electroneutrality of the active materials represented by the formulas.

A is preferably selected from the group consisting of lithium, sodium, potassium and mixtures thereof. In a preferred embodiment, A is lithium, sodium, or a mixture of lithium and sodium. M is preferably selected from the group consisting of vanadium, tantalum, niobium, tungsten, and molybdenum. In a preferred embodiment, M comprises vanadium.

M' may be a +3 element, or a mixture of elements. In a preferred embodiment, M' is a +3 element or mixture of elements. When M' is a mixture of elements, it can be written as $M1'_{c1} M2'_{c2} \ldots Mn'_{cn}$, where the sum of $c1+c2+\ldots+cn$ is equal to c. Preferred elements for M' include, without limitation, vanadium, chromium, manganese, iron, cobalt, nickel, molybdenum, and titanium. In one embodiment, M' may comprise aluminum. In a preferred embodiment, M' comprises an element capable of being oxidized to a higher oxidation state during operation of a rechargeable battery in which it is incorporated.

In a preferred embodiment, the active materials of the invention are represented by general formula $$Li_aNa_{1-a}(VO)_bM'_{1-b}PO_4$$

where a is greater than or equal to zero and less than or equal to 1, b is greater than zero, and M' is a +3 metal or mixture of metals. In one embodiment, M' is selected from the group consisting of vanadium, chromium, manganese, iron, cobalt, nickel, and molybdenum. When b is equal to 1, the active materials are represented by the formula $$Li_aNa_{1-a}(VO)PO_4$$

where a ranges from 0 (for sodium vanadyl phosphate) to 1 (for lithium vanadyl phosphate).

In another aspect, novel active materials are provided for use in a rechargeable battery, having the structure of general formula $$Li_aNa_{a'}K_{a''}(VO)_bM'_cXO_4$$

In the general formula, the sum of a+a'+a" is greater than 0 and less than or equal to 2, b is greater than 0 and less than or equal to 1, and c is greater than or equal to zero and less than one. When a' and a" are zero and a is equal to 1, c is not zero. Also when a and a" are zero and a' is one, c is not zero. In one embodiment, the element X is selected from the group consisting of phosphorus, sulfur, arsenic, and combinations thereof, and M' comprises an element or elements from groups 3-15 of the periodic table. In a preferred embodiment, X comprises phosphorous or arsenic. In another preferred embodiment, X comprises phosphorus. The values of the subscripts a, a', a", b, and c, as well as the identity and oxidation state of the element or elements M' are chosen so as to achieve electroneutrality of the formula.

In one embodiment, a" in the general formula is 0 and X is phosphorus. In this embodiment, the active material has formula $$Li_aNa_{a'}(VO)_bM'_cPO_4$$

wherein the sum of a and a' is greater than 0 and less than or equal to 2.

When a" is zero and b equals 1 in the general formula, the active material has formula $$Li_aNa_{a'}(VO)PO_4$$

When a' and a" are zero, the active material is a lithium compound represented by the formula

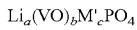

When a and a" are zero, the active material is a sodium compound represented by

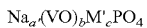

Preferred active materials include those of the above general formulas wherein a is greater than or equal to about 0.8, or the sum of a+a'+a" is greater than about 0.8. In a preferred embodiment, M' and VO (or MO) have the same +2 oxidation state, and the subscript a of the alkali metal A is equal to one. In this embodiment, the formulas can be simplified so that active materials are represented by $A(MO)_b M'_{1-b} PO_4$.

Batteries of the invention contain a positive electrode, a negative electrode, and an electrolyte, wherein at least one electrode contains an active material corresponding to a compound of the general formulas given above for the novel active materials of the invention.

The active material mixed metal phosphates may be synthesized using a carbothermal reduction method in which an alkali metal is incorporated into a metal phosphate with concomitant reduction of at least one metal species of the metal phosphate. The general formula for the reaction can be given as

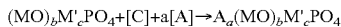

In one embodiment, a is about 1, and the oxidation states of both M and M' are reduced during the reaction.

In the formula, M, M', and b have the meanings given above. The symbol [A] represents a compound that is a source of alkali metal, preferably lithium, sodium and/or potassium. The symbol [C] represents a reducing carbon, defined further below.

Sources of alkali metal A include any of a number of salts or ionic compounds of lithium, sodium, potassium, rubidium or cesium. Lithium, sodium, and potassium compounds are preferred. Preferably, the alkali metal source is provided in powder or particulate form. A wide range of such materials is well known in the field of inorganic chemistry. Non-limiting examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

The reaction may also be carried out with reduction. The reduction may be carried out in situ by including in the reaction mixture a reductant that will participate in the reaction to reduce the metals M or M', but that will preferably produce by-products that will not interfere with the active material when used later in an electrode or an electrochemical cell.

The reductant, which provides reducing power for the reactions, may be provided in the form of a reducing carbon by including a source of elemental carbon along with the other particulate starting materials. In this case, the reducing power is provided by simultaneous oxidation of carbon to either carbon monoxide or carbon dioxide. The carbon monoxide formed from the C→CO reaction may also act as a reducing agent for the reaction.

Alternatively or in addition, reducing power may be provided by an organic material. The organic material is characterized as containing carbon and at least one other element, preferably hydrogen. The organic material generally forms a decomposition product, referred to herein as a carbonaceous material, upon heating under the conditions of the reaction. Without being bound by theory, representative decomposition processes that can lead to the formation of the carbonaceous material include, without limitation, pyrolization, carbonization, coking, destructive distillation, and the like. These process names, as well as the term thermal decomposition, are used interchangeably in this application to refer to the process or processes by which a decomposition product capable of acting as a reductant is formed upon heating of a reaction mixture containing an organic material.

A typical decomposition product contains carbonaceous material. During reaction, at least a portion of the carbonaceous material formed is believed to participate as reductant. That portion that participates as reductant may form a volatile by-product such as discussed below. Any volatile by-product formed tends to escape from the reaction mixture so that it is not incorporated into the reaction product.

Although the invention is understood not to be limited as to the mechanism of action of the organic precursor material, it believed that the carbonaceous material provides reducing power similar to that provided by elemental carbon discussed above. For example, the carbonaceous material may produce carbon monoxide or carbon dioxide, depending on the temperature of the reaction.

It may also be that some of the carbonaceous material providing reducing power is oxidized to a non-volatile component, such as for example, oxygen-containing carbon materials such as, without limitation, alcohols, ketones, aldehydes, esters, and carboxylic acids and anhydrides. Such non-volatile by-products, as well as any carbonaceous material that does not participate as reductant (for example, any present in stoichiometric excess or any that does not otherwise react) will tend to remain in the reaction mixture along with the other reaction products, but will not be significantly covalently incorporated.

The carbonaceous material prepared by heating the organic precursor material will generally be enriched in carbon relative to the mole per cent carbon present in the organic material. The carbonaceous material preferably contains from about 50 up to about 100 mole percent carbon.

While it is believed that the organic precursor material generally forms a carbonaceous decomposition product that acts as a reductant as discussed above, it may be possible that a portion of the organic material participates as reductant without first undergoing a decomposition. The invention is not limited by the exact mechanism or mechanisms of the underlying reduction processes.

Reactions with the organic precursor material are conveniently carried out by combining starting materials and heating. The starting materials include at least one transition metal compound as noted above. The organic precursor material may be any organic material capable of undergoing pyrolysis or carbonization, or any other decomposition process that leads to a carbonaceous material rich in carbon. Such precursors include in general any organic material, i.e., compounds characterized by containing carbon and at least one other element. Although the organic material may be a perhalo compound containing essentially no carbon-hydrogen bonds, typically the organic materials contain carbon and hydrogen. Other elements, such as without limitation halogens, oxygen, nitrogen, phosphorus, and sulfur, may be present in the organic material, as long as they do not significantly interfere with the decomposition process or otherwise prevent the reductions from being carried out. Precursors include without limitation, organic hydrocarbons, alcohols, esters, ketones, aldehydes, carboxylic acids, sulfonates, and ethers. Preferred precursors include the above species containing aromatic rings, especially the aromatic hydrocarbons such as tars, pitches, and other petroleum products or fractions. As used here, hydrocarbon refers to an organic compound made up of carbon and hydrogen, and containing no significant amounts of other elements. Hydrocarbons may contain impurities having some heteroatoms. Such impurities might result, for example, from partial oxidation of a hydrocarbon or incomplete separation of a hydrocarbon from a reaction mixture or natural source such as petroleum.

Other organic precursor materials include sugars and other carbohydrates, including derivatives and polymers. Examples of polymers include, without limitation, starch, cellulose, and their ether or ester derivatives. Other derivatives include, without limitation, the partially reduced and partially oxidized carbohydrates discussed below. On heating, carbohydrates readily decompose to form carbon and water. The term carbohydrates as used here encompasses the D-, L-, and DL-forms, as well as mixtures, and includes material from natural or synthetic sources.

In one sense as used in the invention, carbohydrates are organic materials that can be written with molecular formula $(C)_m(H_2O)_n$, where m and n are integers. For simple hexose or pentose sugars, m and n are equal to each other. Non-limiting examples of hexoses of formula $C_6H_{12}O_6$ include allose, altose, glucose, mannose, gulose, inose, galactose, talose, sorbose, tagatose, and fructose. Pentoses of formula $C_5H_{10}O_5$ are represented by, without limitation, ribose, arabinose, and xylose. Tetroses include erythrose and threose, while glyceric aldehyde is a triose. Other carbohydrates include the two-ring sugars (di-saccharides) of general formula $C_{12}H_{22}O_{11}$. Examples include, without limitation, sucrose, maltose, lactose, trehalose, gentiobiose, cellobiose, and melibiose. Three-ring trisaccharides such as raffinose and higher oligomeric and polymer carbohydrates may also be used. Non-limiting examples include starch and cellulose. As noted above, the carbohydrates readily decompose to carbon and water when heated to a sufficiently high temperature. The water of decomposition tends to turn to steam under the reaction conditions and volatilize.

It will be appreciated that other materials will also tend to readily decompose to $H_2O$ and a material very rich in carbon. Such materials are also intended to be included in the term "carbohydrate" as used in the invention. Such materials include slightly reduced carbohydrates such as, without limitation, glycerol, sorbitol, mannitol, iditol, dulcitol, talitol, arabitol, xylitol, and adonitol, as well as "slightly oxidized" carbohydrates such as, without limitation, gluconic, mannonic, glucuronic, galacturonic, mannuronic, saccharic, manosaccharic, ido-saccharic, mucic, talo-mucic, and allo-mucic acids. The formula of the slightly oxidized and the slightly reduced carbohydrates is similar to that of the carbohydrates.

A preferred carbohydrate is sucrose. Under the reaction conditions, sucrose melts at about 150-180° C. The liquid melt tends to distribute itself among the starting materials. At temperatures above about 450° C., sucrose and other carbohydrates decompose to form carbon and water. The as-decomposed carbon powder is in the form of fresh amorphous fine particles with high surface area and high reactivity.

The precursor material may also be an organic polymer. Organic polymers include without limitation, polyolefins such as polyethylene and polypropylene, butadiene polymers, isoprene polymers, vinyl alcohol polymers, furfuryl alcohol polymers, styrene polymers including polystyrene, polystyrene-polybutadiene and the like, divinylbenzene polymers, naphthalene polymers, phenol condensation products including those obtained by reaction with aldehyde, polyacrylonitrile, polyvinyl acetate, as well as cellulose starch and esters and ethers thereof described above.

In some embodiments, the organic precursor material is a solid available in particulate form. Particulate materials may be combined with the other particulate starting materials and reacted by heating according to the methods described above.

In other embodiments, the organic precursor material may be a liquid. In such cases, the liquid precursor material is combined with the other particulate starting materials to form a mixture. The mixture is heated, whereupon the organic material forms a carbonaceous reducing carbon in situ. The reaction proceeds with carbothermal reduction. The liquid precursor materials may also advantageously serve or function as a binder in the starting material mixture as noted above.

The starting materials are mixed together with a reducing carbon, which is included in an amount sufficient to reduce the metal ion of one or more of the metal-containing starting materials without full reduction to an elemental metal state. Excess quantities of one or more starting materials (for example, about a 5 to 10% excess) may be used to enhance product quality. An excess of carbon, remaining after the reaction, functions as a conductive constituent in the ultimate electrode formulation. This is an advantage since such remaining carbon is very intimately mixed with the product active material. Accordingly, large quantities of excess carbon, on the order of 100% excess carbon or greater are useable in the process. The carbon present during compound formation is thought to be intimately dispersed throughout the precursor and product. This provides many advantages, including the enhanced conductivity of the product. The presence of carbon particles in the starting materials is also thought to provide nucleation sites for the production of the product crystals.

In one embodiment, reducing carbon is provided in stoichiometric excess in the starting materials. To calculate relative molar amounts of reducing carbon, it is convenient to use an "equivalent" weight of the reducing carbon, defined as the weight per gram-mole of carbon atom. For elemental carbons such as carbon black, graphite, and the like, the equivalent weight is about 12 g/equivalent. For other organic materials, the equivalent weight per gram-mole of carbon atoms is higher. For example, hydrocarbons have an equivalent weight of about 14 g/equivalent. Examples of hydrocarbons include aliphatic, alicyclic, and aromatic hydrocarbons, as well as polymers containing predominantly or entirely carbon and hydrogen in the polymer chain. Such polymers include polyolefins and aromatic polymers and copolymers, including without limitation polyethylenes, polypropylenes, polystyrenes, polybutadienes, and the like. Depending on the degree of unsaturation, the equivalent weight may be slightly above or below 14.

For organic materials having elements other than carbon and hydrogen, the equivalent weight for the purpose of calculating a stoichiometric quantity to be used in the reactions is higher than 14. For example, in carbohydrates it is about 30 g/equivalent. Examples of carbohydrates include sugars such as glucose, fructose, and sucrose, as well as polymers such as cellulose and starch.

In a preferred embodiment, reduction is carried out in a reducing atmosphere in the presence of a reductant as discussed above. The term "reducing atmosphere" as used here means a gas or mixture of gases that is capable of providing reducing power for a reaction that is carried out in the atmosphere. Reducing atmospheres generally contain one or more so-called reducing gases. Non-limiting examples of reducing gases include hydrogen, carbon monoxide, methane, and ammonia, as well as mixtures of those. Reducing atmospheres are also generally characterized as having little or no oxidizing gases such as air or oxygen. If any oxidizing gas is present in the reducing atmosphere, it is at a level low enough that it does not significantly interfere with reduction processes going on or that the oxidizing gas is present under controlled conditions so that C can react with the oxygen to produce carbon monoxide which can then act as a reducing agent.

The mixture of starting materials is heated for a time and at a temperature sufficient to form a reaction product. Generally, the particulate starting materials are heated to a temperature below the melting point of the transition metal phosphate compound. At least a portion of the starting material remains in the solid state during the reaction.

The temperature should preferably be about 400° C. or greater, and desirably 450° C. or greater, and preferably 500° C. or greater, and generally will proceed at a faster rate at higher temperatures. The various reactions involve production of CO or $CO_2$ as an effluent gas. The equilibrium at higher temperature favors CO formation. Some of the reactions are more desirably conducted at temperatures greater than 600° C.; most desirably greater than 650° C.; preferably 700° C. or greater; more preferably 750° C. or greater. Suitable ranges for many reactions are about 700 to 950° C., or about 700 to 800° C.

Generally, the higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $CO_2$ reaction involves an increase in carbon oxidation state of +4 (from 0 to 4) and the C to CO reaction involves an increase in carbon oxidation state of +2 (from ground state zero to 2). Here, higher temperature generally refers to a range of about 650° C. to about 1000° C. and lower temperature refers to up to about 650° C. Temperatures higher than 1200° C. are not thought to be needed.

In one aspect, the method of the invention utilizes the reducing capabilities of carbon in a unique and controlled manner to produce desired products having structure and alkali metal content suitable for use as electrode active materials. In one aspect the method of the invention makes it possible to produce products containing lithium, metal and oxygen in an economical and convenient process. The advantages are at least in part achieved by the reductant, carbon, having an oxide whose free energy of formation becomes more negative as temperature increases. Such oxide of carbon is more stable at high temperature than at low temperature. This feature is used to produce products having one or more metal ions in a reduced oxidation state relative to the precursor metal ion oxidation state. The method utilizes an effective combination of quantity of carbon, time and temperature to produce new products and to produce known products in a new way.

Referring back to the discussion of temperature, at about 700° C. both the carbon to carbon monoxide and the carbon to carbon dioxide reactions are occurring. At closer to 600° C. the C to $CO_2$ reaction is the dominant reaction. At closer to 800° C. the C to CO reaction is dominant. Since the reducing effect of the C to $CO_2$ reaction is greater, the result is that less carbon is needed per atomic unit of metal to be reduced. In the case of carbon to carbon monoxide, each atomic unit of carbon is oxidized from ground state zero to plus 2. Thus, for each atomic unit of metal ion (M) which is being reduced by one oxidation state, one half atomic unit of carbon is required. In the case of the carbon to carbon dioxide reaction, one quarter atomic unit of carbon is stoichiometrically required for each atomic unit of metal ion (M) which is reduced by one oxidation state, because carbon goes from ground state zero to a plus 4 oxidation state. These same relationships apply for each such metal ion being reduced and for each unit reduction in oxidation state desired.

The starting materials may be heated at ramp rates from a fraction of a degree up to about 10° C. per minute. Higher or lower ramp rates may be chosen depending on the available equipment, desired turnaround, and other factors. It is also possible to place the starting materials directly into a pre-heated oven. Once the desired reaction temperature is attained, the reactants (starting materials) are held at the reaction temperature for a time sufficient for reaction to occur. Typically the reaction is carried out for several hours at the final reaction temperature. The heating is preferably conducted under non-oxidizing or inert gas such as argon or vacuum, or in the presence of a reducing atmosphere.

Advantageously, a reducing atmosphere is not required, although it may be used if desired. After reaction, the products are preferably cooled from the elevated temperature to ambient (room) temperature (i.e., 10° C. to 40° C.). The rate of cooling may vary according to a number of factors including those discussed above for heating rates. For example, the cooling may be conducted at a rate similar to the earlier ramp rate. Such a cooling rate has been found to be adequate to achieve the desired structure of the final product. It is also possible to quench the products to achieve a higher cooling rate, for example on the order of about 100° C./minute.

Although the reactions may be carried out in oxygen or air, the heating is preferably conducted under an essentially non-oxidizing atmosphere. The atmosphere is essentially non-oxidizing so as not to interfere with the reduction reactions taking place. An essentially non-oxidizing atmosphere can be achieved through the use of vacuum, or through the use of inert gases such as argon, nitrogen, and the like. Although oxidizing gas (such as oxygen or air), may be present, it should not be at so great a concentration that it interferes with the carbothermal reduction or lowers the quality of the reaction product. It is believed that any oxidizing gas present will tend to react with the reducing carbon and lower the availability of the carbon for participation in the reaction. To some extent, such a contingency can be anticipated and accommodated by providing an appropriate excess of reducing carbon as a starting material. Nevertheless, it is generally preferred to carry out the carbothermal reduction in an atmosphere containing as little oxidizing gas as practical.

Advantageously, a reducing atmosphere is not required, although it may be used if desired. For example, the reaction may be carried out in the presence of reducing gases. Non-limiting examples of reducing gases include hydrogen, methane, ammonia, and carbon monoxide. Conveniently, reducing gases, preferably hydrogen, are provided in stoichiometric excess. This may be accomplished by carrying out the heating steps described above in a hydrogen atmosphere. The reducing atmosphere may be provided as pure reducing gas, or as mixtures of reducing gas with other gases. Non-limiting examples of reducing atmospheres include hydrogen, hydrogen-argon, hydrogen-nitrogen, carbon monoxide, carbon monoxide-hydrogen, carbon monoxide-argon, and the like. The reducing gas may but need not be provided in molar excess. The reducing gas may be used in partial pressures from about 0.01 atmospheres up to super-atmospheric, depending on such factors as the size of the sample, the volume of the heating chamber, and the excess of gas, if any, required for the reaction.

Carbothermal reduction according to the invention as described above is essentially a solid state reaction; as such the nature of the product formed in reaction depends on the particle size and the nature of particle to particle contact. Alternatively, the carbothermal reduction can also employ carbon monoxide as a reducing gas for the carbothermal reduction. Preferably, fine powders of starting materials are provided and the powdered or particulate starting materials are formed into a mixture by a process such as ball-milling or the like and then pelletized by means of either pressure in a pelletizing process or in a mixture having a binder. Particulate mixtures are preferred in order to bring the particulate starting materials into close contact. The pelletization process brings the individual particle grains into close proximity so as to aid in the solid state reaction. If there is inhomogeneity in the starting materials or if the particles are not brought into contact well with one another it can lead to inhomogeneous products, lower yields, or lower quality products. The use of an atmosphere containing a reducing gas during the carbothermal reaction ensures a more uniform reaction, leading to more homogeneous products, higher yields, and higher quality products.

The metal phosphate $(MO)_b M'_{1-b} PO_4$ used in the carbothermal synthetic route can be synthesized by reacting a $M^{5+}$ oxide (meaning an oxide of a metal in a +5 oxidation state), a source of metal M', and a source of phosphate in a chemical precipitation or a reflux preparation synthetic route.

Sources of metals M' include salts or compounds of any of the transition metals, alkaline earth metals, or lanthanide metals, as well as of non-transition metals such as aluminum, gallium, indium, thallium, tin, lead, and bismuth. The metal compounds include, without limitation, fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used, as well as mixtures of metals, as with the alkali metals, so that alkali metal mixed metal active materials are produced. The metal M' in the starting material may have any oxidation state, depending on the oxidation state required in the desired product and the oxidizing or reducing conditions contemplated, as discussed below. The metal sources are chosen so that at least one metal in the final reaction product is capable of being in an oxidation state higher than it is in the reaction product.

Sources of phosphate include any compound containing the phosphate group that will participate in the reaction to form the vanadyl metal phosphate. Such compounds include phosphoric acid $H_3PO_4$ as well as hydrogen phosphate salts and dihydrogen phosphate salts. In a preferred embodiment, phosphoric acid can be used as the source of phosphate.

In one embodiment, a source of phosphate is dissolved in water. Solid $M^{5+}$ oxide and the source, if used, of M' is added to the solution to make a suspension. The suspension is preferably stirred and heated to effect reaction. In a preferred embodiment, the suspension is heated to about 80° C. or higher, and is preferably stirred at reflux (i.e., at or above the boiling point of the water) for several hours until reaction is complete.

Following decanting or filtration to recover the solid reaction product, the product is usually washed with cold water to remove impurities and dried at about 30-100° C. to remove surface water. The product obtained is generally a hydrate of general formula $(MO)_b M'_{1-b} PO_4 \cdot nH_2O$ where n is typically about 2. The water of hydration can be removed by heating to a temperature above 100° C. Alternatively, the hydrate product may be used directly in the carbothermal step to follow.

Sources of $M^{5+}$ oxide generally have the formula $M_2O_5$. An example used in a preferred embodiment is vanadium pentoxide, $V_2O_5$. It can be used directly from a commercial source. It is preferred to generate $V_2O_5$ as needed, because commercial $V_2O_5$ tends to form $V^{4+}$ species when in contact with atmospheric reducing agents. A practical way of producing high purity vanadium pentoxide is by thermal decomposition of a metal vanadate compound such as ammonium metavanadate. The reaction can be written as $2NH_4VO_3 \rightarrow V_2O_5 + 2NH_3 + H_2O$ In one embodiment, ammonium metavanadate is decomposed at a temperature of about 500° C. in an air filled box oven. Ammonium metavanadate is commercially available, for example, from Alfa-Aesar.

The present invention also provides electrodes comprising an electrode active material of the present invention. In a preferred embodiment, the electrodes of the present invention comprise an electrode active material of this invention, a binder; and an electrically conductive carbonaceous material.

In a preferred embodiment, the electrodes of this invention comprise:
(a) from about 25% to about 95%, more preferably from about 50% to about 90%, active material;
(b) from about 2% to about 95% electrically conductive material (e.g., carbon black); and
(c) from about 3% to about 20% binder chosen to hold all particulate materials in contact with one another without degrading ionic conductivity.

(Unless stated otherwise, all percentages herein are by weight.) Cathodes of this invention preferably comprise from about 50% to about 90% of active material, about 5% to about 30% of the electrically conductive material, and the balance comprising binder. Anodes of this invention preferably comprise from about 50% to about 95% by weight of the electrically conductive material (e.g., a preferred graphite), with the balance comprising binder.

Electrically conductive materials among those useful herein include carbon black, graphite, powdered nickel, metal particles, conductive polymers (e.g., characterized by a conjugated network of double bonds like polypyrrole and polyacetylene), and mixtures thereof. Binders useful herein preferably comprise a polymeric material and extractable plasticizer suitable for forming a bound porous composite. Preferred binders include halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

In a preferred process for making an electrode, the electrode active material is mixed into a slurry with a polymeric binder compound, a solvent, a plasticizer, and optionally the electroconductive material. The active material slurry is appropriately agitated, and then thinly applied to a substrate via a doctor blade. The substrate can be a removable substrate or a functional substrate, such as a current collector (for example, a metallic grid or mesh layer) attached to one side of the electrode film. In one embodiment, heat or radiation is applied to evaporate the solvent from the electrode film, leaving a solid residue. The electrode film is further consolidated, where heat and pressure are applied to the film to sinter and calendar it. In another embodiment, the film may be air-dried at moderate temperature to yield self-supporting films of copolymer composition. If the substrate is of a removable type it is removed from the electrode film, and further laminated to a current collector. With either type of substrate it may be necessary to extract the remaining plasticizer prior to incorporation into the battery cell.

The batteries of the present invention comprise:
(a) a first electrode comprising an active material of the present invention;
(b) a second electrode which is a counter-electrode to said first electrode; and
(c) an electrolyte between said electrodes.

The electrode active material of this invention may comprise the anode, the cathode, or both. Preferably, the electrode active material comprises the cathode.

The active material of the second, counter-electrode is any material compatible with the electrode active material of this invention. In embodiments where the electrode active material comprises the cathode, the anode may comprise any of a variety of compatible anodic materials well known in the art, including lithium, lithium alloys, such as alloys of lithium with tin, tin oxides, phosphides, aluminum, mercury, manganese, iron, zinc, and intercalation based anodes such as those employing carbon, tungsten oxides, and mixtures thereof. In a preferred embodiment, the anode comprises:
(a) from about 0% to about 95%, preferably from about 25% to about 95%, more preferably from about 50% to about 90%, of an insertion material;
(b) from about 2% to about 95% electrically conductive material (e.g., carbon black); and
(c) from about 3% to about 20% binder chosen to hold all particulate materials in contact with one another without degrading ionic conductivity.

In a particularly preferred embodiment, the anode comprises from about 50% to about 90% of an insertion material selected from the group active material from the group consisting of metal oxides (particularly transition metal oxides), metal chalcogenides, and mixtures thereof. In another preferred embodiment, the anode does not contain an insertion active, but the electrically conductive material comprises an insertion matrix comprising carbon, graphite, cokes, mesophase carbons and mixtures thereof. One preferred anode insertion material is carbon, such as coke or graphite, which is capable of forming the compound $Li_xC$. Insertion anodes among those useful herein are described in U.S. Pat. No. 5,700,298, Shi et al., issued Dec. 23, 1997; U.S. Pat. No. 5,712,059, Barker et al., issued Jan. 27, 1998; U.S. Pat. No. 5,830,602, Barker et al., issued Nov. 3, 1998; and U.S. Pat. No. 6,103,419, Saidi et al., issued Aug. 15, 2000; all of which are incorporated by reference herein.

In embodiments where the electrode active material comprises the anode, the cathode preferably comprises:
(a) from about 25% to about 95%, more preferably from about 50% to about 90%, active material;
(b) from about 2% to about 95% electrically conductive material (e.g., carbon black); and
(c) from about 3% to about 20% binder chosen to hold all particulate materials in contact with one another without degrading ionic conductivity.

Active materials useful in such cathodes include electrode active materials of this invention, as well as metal oxides (particularly transition metal oxides), metal chalcogenides, and mixtures thereof. Other active materials include lithiated transition metal oxides such as $LiCoO_2$, $LiNiO_2$, and mixed transition metal oxides such as $LiCo_{1-m}Ni_mO_2$, where $0<m<1$. Another preferred active material includes lithiated spinel active materials exemplified by compositions having a structure of $LiMn_2O_4$, as well as surface treated spinels such as disclosed in U.S. Pat. No. 6,183,718, Barker et al., issued Feb. 6, 2001, incorporated by reference herein. Blends of two or more of any of the above active materials may also be used. The cathode may alternatively further comprise a basic compound to protect against electrode degradation as described in U.S. Pat. No. 5,869,207, issued Feb. 9, 1999, incorporated by reference herein.

The batteries of this invention also comprise a suitable electrolyte that provides for transfer of ions between the cathode and anode. The electrolyte is preferably a material that exhibits high ionic conductivity, as well as having insular properties to prevent self-discharging during storage. The electrolyte can be either a liquid or a solid. Solid electrolytes preferably comprise a polymeric matrix which contains an ionic conductive medium. A liquid electrolyte preferably comprises a solvent and an alkali metal salt that form an ionically conducting liquid.

One preferred embodiment is a solid polymeric electrolyte, comprising a solid polymeric matrix of an electrolyte compatible material formed by polymerizing an organic or inorganic monomer (or partial polymer thereof) and which, when used in combination with the other components of the electrolyte, results in a solid state electrolyte. Suitable solid polymeric matrices include those well known in the art and include solid matrices formed from organic polymers, inorganic polymers or a solid matrix forming monomer and from partial polymers of a solid matrix forming monomer.

The polymeric electrolyte matrix comprises a salt, typically inorganic, which is homogeneously dispersed via a solvent vehicle throughout the matrix. The solvent is preferably a low molecular weight organic solvent added to the electrolyte, which may serve the purpose of solvating the inorganic ion salt. The solvent is preferably any compatible, relatively non-volatile, aprotic, relatively polar solvent, including dimethyl carbonate (DMC), diethyl carbonate (DEC), dipropylcarbonate (DPC), ethyl methyl carbonate (EMC), butylene carbonate, gamma-butyrolactone, triglyme, tetraglyme, lactones, esters, dimethylsulfoxide, dioxolane, sulfolane, and mixtures thereof. Preferred solvents include EC/DMC, EC/DEC, EC/DPC and EC/EMC. Preferably, the inorganic ion salt is a lithium or sodium salt, such as for example, $LiAsF_6$, $LiPF_6$, $LiClO_4$, $LiB(C_6H_5)_4$, $LiAlCl_4$, LiBr, $LiBF_4$, their sodium analogs, and mixtures thereof, with the less toxic salts being preferable. The salt content is preferably from about 5% to about 65%, preferably from about 8% to about 35%. A preferred embodiment is a mixture of EC:DMC:$LiPF_6$ in a weight ratio of about 60:30:10. Electrolyte compositions among those useful herein are described in U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No.

6,020,087, Gao, issued Feb. 1, 2001; and U.S. Pat. No. 6,103,419, Saidi et al., issued Aug. 15, 2000; all of which are incorporated by reference herein.

Additionally, the electrolyte comprises a separator, or is surrounded by a separator membrane. The separator allows the migration of ions through the membrane while still providing a physical separation of the electric charge between the electrodes, to prevent short-circuiting. Preferably, the separator also inhibits elevated temperatures within the battery that can occur due to uncontrolled reactions, preferably by degrading upon high temperatures to provide infinite resistance to prevent further uncontrolled reactions. In a preferred embodiment, the polymeric matrix of the electrolyte can contain an additional polymer (a separator) or the original polymeric matrix itself may function as a separator, providing the physical isolation needed between the anode and cathode.

A preferred electrolyte separator film comprises approximately two parts polymer for every one part of a preferred fumed silica. The conductive solvent comprises any number of suitable solvents and salts. Desirable solvents and salts are described in U.S. Pat. No. 5,643,695, Barker et al., issued Jul. 1, 1997; and U.S. Pat. No. 5,418,091, Gozdz et al., issued May 23, 1995; both of which are incorporated by reference herein. One example is a mixture of $EC:DMC:LiPF_6$ in a weight ratio of about 60:30:10.

A separator membrane element is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are preferred. Inorganic filler adjuncts, such as fumed alumina or silanized fumed silica, may be used to enhance the physical strength and melt viscosity of a separator membrane and, in some compositions, to increase the subsequent level of electrolyte solution absorption.

A preferred battery comprises a laminated cell structure, comprising an anode layer, a cathode layer, and electrolyte/separator between the anode and cathode layers. The anode and cathode layers comprise a current collector. A preferred current collector is a copper collector foil, preferably in the form of an open mesh grid. The current collector is connected to an external current collector tab. Such structures are disclosed in, for example, U.S. Pat. No. 4,925,752, Fauteux et al, issued May 15, 1990; U.S. Pat. No. 5,011,501, Shackle et al., issued Apr. 30, 1991; and U.S. Pat. No. 5,326,653, Chang, issued Jul. 5, 1994; all of which are incorporated by reference herein. In a battery embodiment comprising multiple electrochemical cells, the anode tabs are preferably welded together and connected to a nickel lead. The cathode tabs are similarly welded and connected to a welded lead, whereby each lead forms the polarized access points for the external load.

Lamination of assembled cell structures is accomplished by conventional means by pressing between metal plates at a temperature of about 120-160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

In a preferred embodiment, an electrode membrane comprising the electrode active material (e.g., an insertion material such as carbon or graphite or a insertion compound) is dispersed in a polymeric binder matrix. The electrolyte/separator film membrane is preferably a plasticized copolymer, comprising a polymeric separator and a suitable electrolyte for ion transport. The electrolyte/separator is positioned upon the electrode element and is covered with a positive electrode membrane comprising a composition of a finely divided lithium insertion compound in a polymeric binder matrix. An aluminum collector foil or grid completes the assembly. A protective bagging material covers the cell and prevents infiltration of air and moisture.

In another embodiment, a multi-cell battery configuration may be prepared with copper current collector, a negative electrode, an electrolyte/separator, a positive electrode, and an aluminum current collector. Tabs of the current collector elements form respective terminals for the battery structure.

In a preferred embodiment of a lithium-ion battery, a current collector layer of aluminum foil or grid is overlaid with a positive electrode film, or membrane, separately prepared as a coated layer of a dispersion of insertion electrode composition. This is preferably an insertion compound such as the active material of the present invention in powder form in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Cells comprising electrodes, electrolytes and other materials among those useful herein are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Sep. 16, 1995; and U.S. Pat. No. 6,306,215, Larkin, issued Oct. 23, 2001. A preferred electrolyte matrix comprises organic polymers, including VdF:HFP. Examples of casting, lamination and formation of cells using VdF:HFP are as described in U.S. Pat. No. 5,418, 091, Gozdz et al., issued May 23, 1995; U.S. Pat. No. 5,460, 904, Gozdz et al., issued Oct. 24, 1995; U.S. Pat. No. 5,456, 000, Gozdz et al., issued Oct. 10, 1995; and U.S. Pat. No. 5,540,741, Gozdz et al., issued Jul. 30, 1996; all of which are incorporated by reference herein.

The electrochemical cell architecture is typically governed by the electrolyte phase. A liquid electrolyte battery generally has a cylindrical shape, with a thick protective cover to prevent leakage of the internal liquid. Liquid electrolyte batteries tend to be bulkier relative to solid electrolyte batteries due to the liquid phase and extensive sealed cover. A solid electrolyte battery, is capable of miniaturization, and can be shaped into a thin film. This capability allows for a much greater flexibility when shaping the battery and configuring the receiving apparatus. The solid state polymer electrolyte cells can form flat sheets or prismatic (rectangular) packages, which can be modified to fit into the existing void spaces remaining in electronic devices during the design phase.

The invention has been described above with respect to several preferred embodiments. Further non-limiting description of the invention is given in the following examples.

EXAMPLES

Example 1

The Preparation of $LiVOPO_4$ was Carried Out in Three Stages:

(a) Thermal decomposition of ammonium metavanadate, $NH_4VO_3$, to produce $V_2O_5$.

Commercial $V_2O_5$ exposed to atmospheric reducing agents may contain significant amounts of $V^{4+}$. The reaction for the thermal decomposition of ammonium metavanadate is:

$$2.0NH_4VO_3 \rightarrow V_2O_5 + 2.0NH_3 + H_2O$$

The ammonium metavanadate is decomposed at 500° C. in an air-filled box oven. The ammonium metavanadate is commercially available from several sources such as Alfa-Aesar.

(b) Chemical Precipitation (reflux preparation) of $\alpha$-$VOPO_4 \cdot xH_2O$.

40.1 g of phosphoric acid ($H_3PO_4$—Aldrich Chemical) is dissolved in 200.0 g of deionized water. 7.2 g of solid $V_2O_5$ (from (a) above) is added to the phosphoric acid solution and the suspension is brought to about 80° C. with constant stirring using a stirrer hot plate. The reaction scheme may be written as:

$$0.5V_2O_5 + H_3PO_4 + xH_2O \rightarrow VOPO_4 \cdot xH_2O + 1.5H_2O$$

After a reflux period of 16 hours the suspension was filtered and the yellow product washed several times with cold deionized water. Finally the product was dried at 60° C. under a dynamic vacuum.

The drying procedure is expected to remove surface adsorbed water, to leave the dihydrate product, $VOPO_4 \cdot 2H_2O$. The x-ray diffraction pattern for the product, is consistent with the layered tetragonal structure expected for this material. This structure consists of sheets of $(VOPO_4)_\infty$ in which each VO group is linked to four $PO_4$ tetrahedra.

To confirm the extent of hydration in the product material the sample was studied by thermogravimetric analysis (TGA). The sample was heated in an air atmosphere from 20° C. to 700° C. at a heating rate of 10°/min. For a $VOPO_4 \cdot 2H_2O$ dehydration mechanism, the weight changes expected for the reaction:

$$VOPO_4 \cdot xH_2O \rightarrow VOPO_4 + 2.0H_2O$$

TGA equates to a 18.2% weight loss. In the approximate temperature range 20-200° C., TGA indicates two main processes, presumably related to sequential loss of the two moles of $H_2O$. The overall loss observed in the TGA is around 18.0% correlates fairly precisely with the expected weight loss.

c) Carbothermal reduction of $VOPO_4$ using $Li_2CO_3$ as lithium source.

The general reaction schemes used may be summarized:

$$VOPO_4 + 0.5Li_2CO_3 + 0.25C \rightarrow LiVOPO_4 + 0.75CO_2$$

The reaction above is used when the desired reaction temperature is less than about 670° C. and the carbothermal reduction proceeds via a $CO_2$ mechanism. Conversely, if the desired reaction temperature is greater than about 670° C. the carbothermal reduction proceeds via a CO mechanism:

$$VOPO_4 + 0.5Li_2CO_3 + 0.5C \rightarrow LiVOPO_4 + 0.5CO_2 + 0.5CO$$

For the $CO_2$ reaction mechanism, 1.0 g-mol of $VOPO_4$ is equivalent to 161.90 g
0.5 g-mol of $Li_2CO_3$ is equivalent to 36.95 g
0.25 g-mol of carbon is equivalent to 3.00 g 3.24 g of $VOPO_4$ (dried at 200° C. to remove $H_2O$), 0.74 g of $Li_2CO_3$ (Pacific Lithium Company) and 0.06 g of Shawinighan black carbon (Chevron). This represents no excess of carbon in the reaction. The precursors were initially pre-mixed using a mortar and pestle and then pelletized. The pellet was placed in a covered Ni crucible and transferred to a temperature-controlled tube furnace equipped with a flowing argon gas flow. The sample was heated at a ramp rate of 2°/minute to an ultimate temperature of 500° C. and maintained at this temperature for 30 minutes. The sample was then cooled to room temperature, before being removed from the box oven for analysis. The powderized sample showed good uniformity and appeared ochre in color.

The x-ray diffraction pattern was measured. The peaks in could be indexed using a standard structural refinement program. The compound is orthorhombic, space group Pnma, a=7.454 A, b=6.281 A, c=7.179 A and unit cell volume=336.16 $A^3$.

The $LiVOPO_4$ may be prepared under alternative carbothermal conditions where carbon is present in excess. 1.28 g of $VOPO_4$ (dried at 200° C. to remove $H_2O$), 0.29 g of $Li_2CO_3$ (Pacific Lithium Company) and 0.04 g of Shawinighan black carbon (Chevron). This represents an approximate 60% excess of carbon in the reaction. The precursors were initially pre-mixed using a mortar and pestle and then pelletized. The pellet was placed in a covered Ni crucible and then transferred to a temperature-controlled tube furnace equipped with a flowing argon gas flow. The sample was heated at a ramp rate of 2°/minute to an ultimate temperature of 450° C. and maintained at this temperature for 48 hours. The sample was then cooled to room temperature, before being removed from the box oven for analysis. The powderized sample showed good uniformity and appeared green in color.

Again the x-ray diffraction pattern was taken. All the peaks could be indexed using a standard structural refinement program. The compound was orthorhombic space group Pnma, a=7.446 A, b=6.278 A, c=7.165 A and unit cell volume=335.0 $A^3$.

Example 2

Preparation of $Li_aM_b(VO)_{1-b}PO_4$—for Example $Li_{1.00}(VO)_{0.75}Mn_{0.25}PO_4$ The $Li_{1.00}(VO)_{0.75}Mn_{0.25}PO_4$ material serves as an example (M=Mn) only of the system. Other $Li_yMn_y$ (VO)$_{1-y}$PO$_4$ stoichiometries may be prepared by modification of the example reactions given below. In addition, other substituted vanadyl phosphates (e.g. M=Cr, Fe, Co, Ni, Mo, Al etc.) can be made by a similar procedure. As an example, the preparation of Li$_{1.00}$(VO)$_{0.75}$Mn$_{0.25}$PO$_4$ was carried out in three stages:

(a) Thermal decomposition of ammonium metavanadate, NH$_4$VO$_3$, to produce V$_2$O$_5$.

See Example 1(a) for details.

(b) Chemical Precipitation (reflux preparation) (VO)$_{0.75}$Mn$_{0.25}$PO$_4$.xH$_2$O.

40.1 g of phosphoric acid (H$_3$PO$_4$—Aldrich Chemical) is dissolved in 200.0 g of deionized water. 5.4 g of solid V$_2$O$_5$ (from (a) above) and 3.0 g KMnO$_4$ (Aldrich Chemical) added to the phosphoric acid solution and the suspension is brought to about 80° C. with constant stirring using a stirrer hot plate. The reaction scheme may be written:

$$0.375V_2O_5+0.25[Mn]+H_3PO_4+xH_2O \rightarrow (VO)_{0.75}Mn_{0.25}PO_4 \cdot xH_2O+1.5H_2O$$

After a reflux period of 16 hours the suspension was filtered and the yellow product washed several times with cold deionized water. Finally the product was dried at 60° C. under a dynamic vacuum.

The vacuum drying procedure is expected to remove surface adsorbed water, to leave the an approximate dihydrate product, (VO)$_{0.75}$Mn$_{0.25}$PO$_4$.2H$_2$O. In comparison with the un-substituted VOPO$_4$.2H$_2$O, the manganese product may contain additional crystalline H$_2$O associated with the Mn. The x-ray diffraction pattern for the product, is consistent with the layered tetragonal structure expected for this material.

To confirm the extent of hydration in the product material the sample was studied by TGA. The sample was heated in an air atmosphere from 20° C. to 700° C. at a heating rate of 10°/min. For a (VO)$_{0.75}$Mn$_{0.25}$PO$_4$.2H$_2$O dehydration mechanism, the weight changes expected for the reaction:

$$(VO)_{0.75}Mn_{0.25}PO_4 \cdot 2H_2O \rightarrow (VO)_{0.75}Mn_{0.25}PO_4+2.0H_2O$$

equates to a 18.5% weight loss. In the approximate temperature range 20-200° C., TGA indicates two main processes (presumably a similar weight loss mechanism to that recorded for the un-substituted material), which account for an approximate 14% weight loss. Beyond 200° C. there is a continued weight loss, until at about 700° C. there is a total weight loss from the sample of 18%.

(c) Carbothermal reduction of (VO)$_{0.75}$Mn$_{0.25}$PO$_4$ using Li$_2$CO$_3$ as lithium source.

The general reaction schemes used may be summarized:

$$(VO)_{0.75}Mn_{0.25}PO_4+0.5Li_2CO_3+0.25C \rightarrow Li(VO)_{0.75}Mn_{0.25}PO_4+0.75CO_2$$

The reaction above is used when the desired reaction temperature is less than about 670° C. and the carbothermal reduction proceeds via a CO$_2$ mechanism. Conversely, if the desired reaction temperature is greater than about 670° C. the carbothermal reduction proceeds via a CO mechanism:

$$(VO)_{0.75}Mn_{0.25}PO_4+0.5Li_2CO_3+0.5C \rightarrow Li(VO)_{0.75}Mn_{0.25}PO_4+0.5CO_2+0.5CO$$

For the CO$_2$ reaction mechanism,
1.0 g-mol of (VO)$_{0.75}$Mn$_{0.25}$PO$_4$ is equivalent to 158.9 g
0.5 g-mol of Li$_2$CO$_3$ is equivalent to 36.95 g
0.25 g-mol of carbon is equivalent to 3.00 g
1.59 g of (VO)$_{0.75}$Mn$_{0.25}$PO$_4$ (prepared as in b) above and dried at 200° C. to remove H$_2$O), 0.37 g of Li$_2$CO$_3$ (Pacific Lithium Company) and 0.05 g of Shawinighan black carbon (Chevron). This represents an approximate 70% mass excess of carbon in the reaction. The precursors were initially pre-mixed using a mortar and pestle and then pelletized. The pellet was placed in a covered ceramic crucible and then transferred to a temperature-controlled tube furnace equipped with a flowing argon gas flow. The sample was heated at a ramp rate of 2°/minute to an ultimate temperature of 650° C. and maintained at this temperature for 4 hours. The sample was then cooled to room temperature, before being removed from the box oven for analysis. The powderized sample showed reasonable uniformity and appeared green in color.

Example 3

The Preparation of NaVOPO$_4$ was Carried Out in Three Stages:

(a) Thermal decomposition of ammonium metavanadate, NH$_4$VO$_3$, to produce V$_2$O$_5$.

See Example 1(a) for details.

(b) Chemical Precipitation (reflux preparation) of α-VOPO$_4$.xH$_2$O.

See Example 1(b) for details.

(c) Carbothermal reduction of VOPO$_4$ using Na$_2$CO$_3$ as sodium source.

The general reaction schemes used may be summarized:

$$VOPO_4+0.5Na_2CO_3+0.25C \rightarrow NaVOPO_4+0.75CO_2$$

The reaction above is used when the desired reaction temperature is less than about 670° C. and the carbothermal reduction proceeds via a CO$_2$ mechanism. Conversely, if the desired reaction temperature is greater than about 670° C. the carbothermal reduction proceeds via a CO mechanism:

$$VOPO_4+0.5Na_2CO_3+0.5C \rightarrow NaVOPO_4+0.5CO_2+0.5CO$$

Based on the CO$_2$ reaction mechanism:
1.0 g-mol of VOPO$_4$ is equivalent to 161.90 g
0.5 g-mol of Na$_2$CO$_3$ is equivalent to 53.00 g
0.25 g-mol of carbon is equivalent to 3.00 g
4.86 g of VOPO$_4$ (dried at 200° C. to remove H$_2$O), 1.59 g of Na$_2$CO$_3$ (Alfa Aesar) and 0.105 g of Shawinighan black carbon (Chevron). This represents an approximate 17% excess of carbon in the reaction. The precursors were initially pre-mixed using a mortar and pestle and then pelletized. The pellet was placed in a covered and sealed (to exclude ambient air) Ni crucible and then transferred to a temperature-controlled box oven. The sample was heated at a ramp rate of 2°/minute to an ultimate temperature of 600° C. and maintained at this temperature for 30 minutes. The sample was then cooled to room temperature, before being removed from the box oven for analysis. The powderized sample showed reasonable uniformity and appeared black in color.

Example 4

NaVOPO$_4$ was prepared as in Example 3(c), except that the ultimate temperature was 700° C.

Example 5

Electrochemical Characterization of LiVOPO$_4$

For electrochemical evaluation purposes the active materials were cycled against a lithium metal counter electrode. The active materials were used to formulate the positive electrode. The electrode was fabricated by solvent casting a slurry of the active material, conductive carbon, binder and solvent.

The conductive carbon used was Super P (MMM Carbon). Kynar Flex 2801 was used as the binder and electronic grade acetone was used as the solvent. The slurry was cast onto glass and a free-standing electrode film was formed as the solvent evaporated. The proportions are as follows on a weight basis: 80% active material; 8% Super P carbon; and 12% Kynar binder.

For all electrochemical measurements the liquid electrolyte was Ethylene Carbonate/DiMethyl Carbonate, EC/DMC (2:1 by weight) and 1 M $LiPF_6$. This was used in conjunction with a Glass Fiber filter to form the anode-cathode separator. Routine electrochemical testing was carried out using a commercial battery cycler utilizing constant current cycling between pre-set voltage limits. High-resolution electrochemical data was collected using the Electrochemical voltage spectroscopy (EVS) technique. Such technique is known in the art as described in Synth. Met. D217 (1989); Synth. Met. 32, 43 (1989); J. Power Sources, 52, 185 (1994); and Electrochimica Acta 40, 1603 (1995).

FIG. 1 shows the first cycle constant current data of the $LiVOPO_4$ material of Example 1. The data were collected using a lithium metal counter electrode at an approximate C/50 rate between 3.00 and 4.05 V and are based upon 21.1 mg of the $LiVOPO_4$ active material in the positive electrode. The testing was carried out at 23° C. The initial measured open circuit voltage (OCV) was approximately 3.10 V vs. Li. Lithium is extracted from the $LiVOPO_4$ during charging of the cell. A charge equivalent to a material specific capacity of 135 mAh/g is extracted from the cell. The theoretical specific capacity for $LiVOPO_4$ (assuming all the lithium is extracted) is 159 mAh/g. Consequently, the positive electrode active material corresponds to $Li_{1-x}VOPO_4$ where x equates to about 0.85, when the active material is charged to about 4.05 V vs. Li. When the cell is discharged to approximately 3.00 V a quantity of lithium is re-inserted into the $Li_{1-x}VOPO_4$. The re-insertion process corresponds to approximately 112 mAh/g, indicating reversibility of the $LiVOPO_4$ material. At 3.00 V the positive active material corresponds to approximately $Li_{0.86}VOPO_4$. The generally symmetrical nature of the charge-discharge curves further indicates the reversibility of the system.

Figure 2:
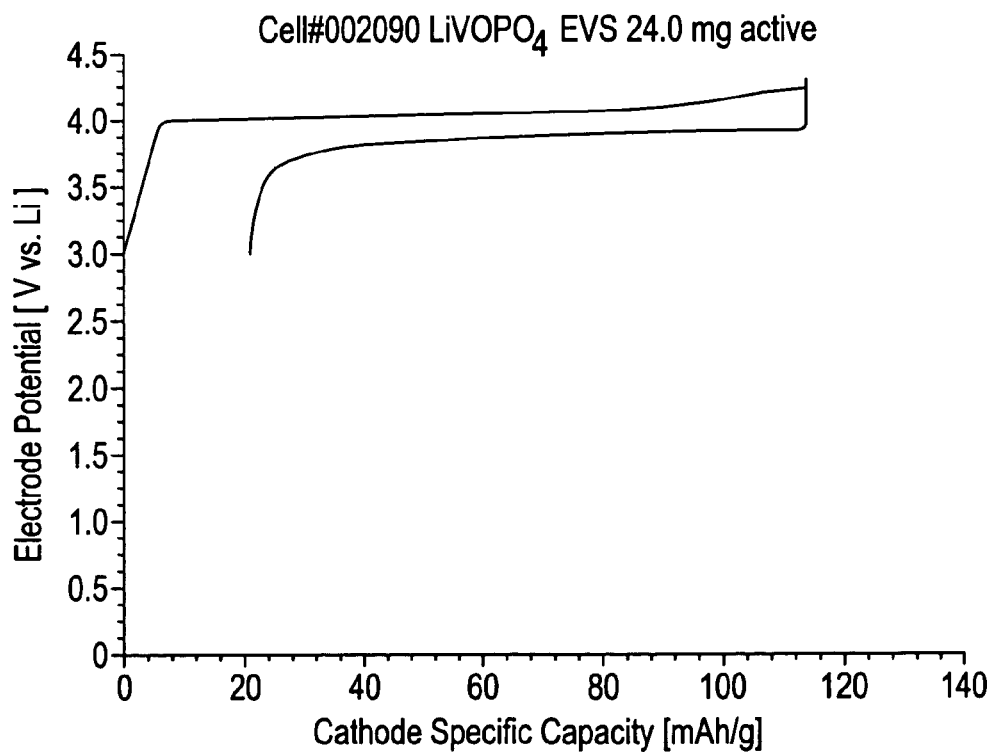
FIG. 2 shows the electrode potential versus specific capacity data for LiVOPO$_4$.
Figure 3:
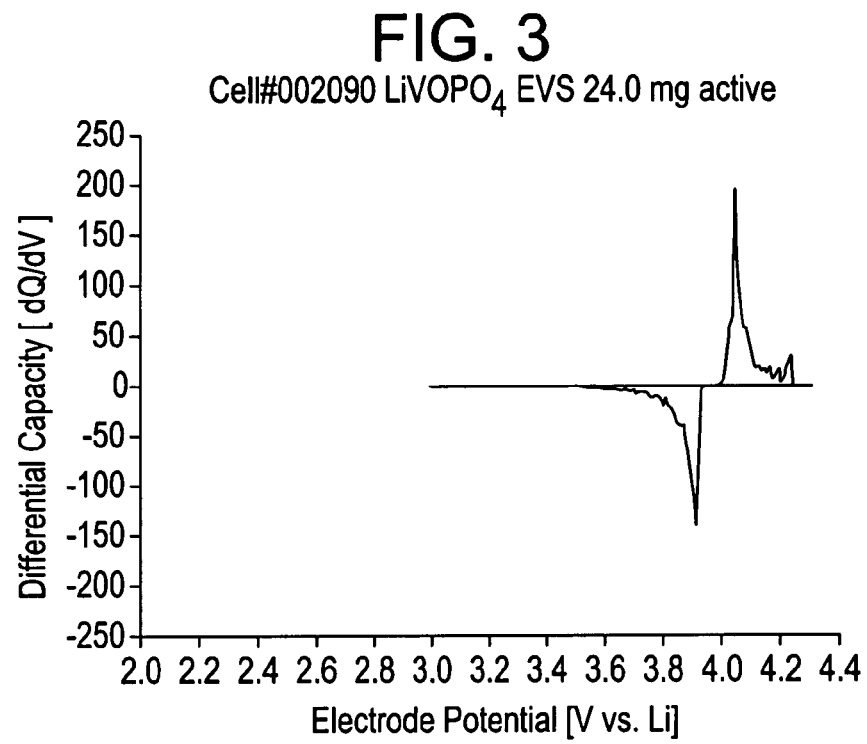
FIG. 3 shows the EVS differential capacity data for LiVOPO$_4$.

The $LiVOPO_4$ material was further subjected to high resolution electrochemical testing using the Electrochemical Voltage Spectroscopy (EVS) technique. FIG. 2 shows the electrode potential versus specific capacity data for this material when cycled between voltage limits of 3.00 and 4.30 V. The EVS test was carried out an approximate C/10 rate. Thus, the test result shown is about three times the rate of the constant current data shown in FIG. 1. The weight of the active material was 24.0 mg and the test was carried out at 23° C. A charge equivalent to a material specific capacity of 114 mAh/g is extracted from the cell. Thus, when fully charged the positive electrode active material, represented by $Li_{1-x}VOPO_4$, corresponds to $Li_{0.72}VOPO_4$. The re-insertion process corresponds to approximately 93 mAh/g, indicating reasonable coulomb reversibility of the $LiVOPO_4$ material. The figure, however, does also indicate some hysteresis between the charge and discharge curves, consistent with a distinct overvoltage in the system, which presumably arises as a consequence of a kinetic polarization. This property is supported by the observation of lower overvoltage in the data collected at C/50 rate shown in FIG. 1. FIG. 3, the EVS differential capacity data, further indicates the reasonable reversibility. The symmetrical nature of the main charge-discharge peak (4.05V on charge, 3.90V on discharge) indicates the electrochemical reversibility.

Figure 4A:
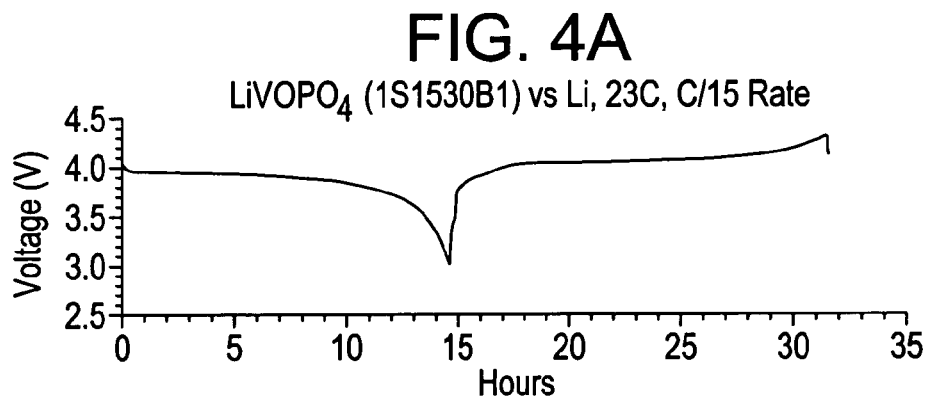
FIG. 4 shows a long term cycling test of a representative iteration of the LiVOPO$_4$ material.
Figure 4B:
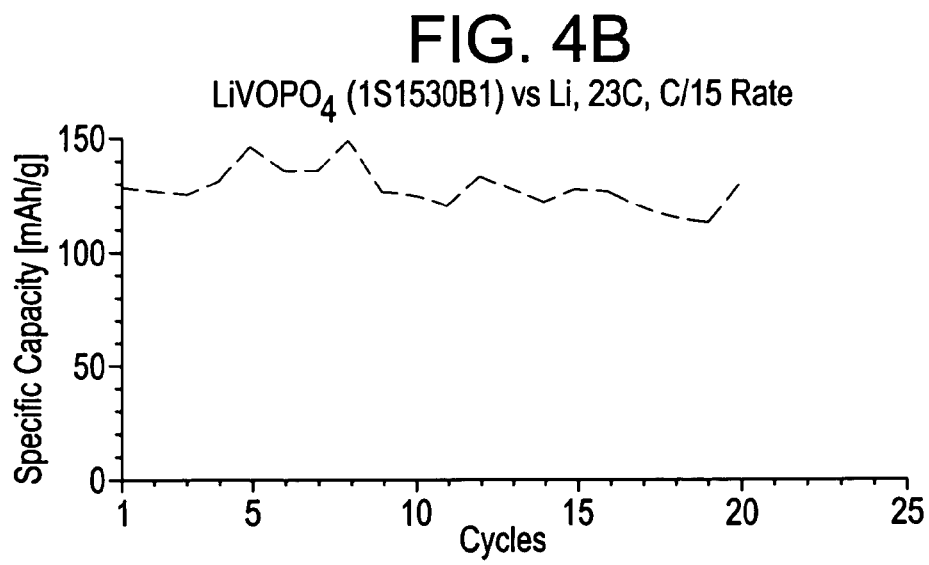

A long term cycling test of a representative iteration of the $LiVOPO_4$ material (1S1530B1) was performed in a lithium anode cell configuration and is shown in FIG. 4. FIG. 4 is a two-part graph for Cell#V003075A. The constant current cycling was undertaken between pre-set voltage limits of 3.00 and 4.30 V at an approximate C/15 rate using a commercial Maccor Inc. Battery Cycler. The cell was tested at 23° C. FIG. 4A indicates that the material good cycling behavior over the 20 cycles shown, and reveals a reversible specific capacity for the $LiVOPO_4$ material of around 130 mAh/g. FIG. 4A is a voltage versus time plot and shows the voltage profile for a typical $LiVOPO_4$ discharge-charge cycle.

Example 6

Electrochemical Characterization of $Li(VO)_{0.75}Mn_{0.25}PO_4$

Figure 5:
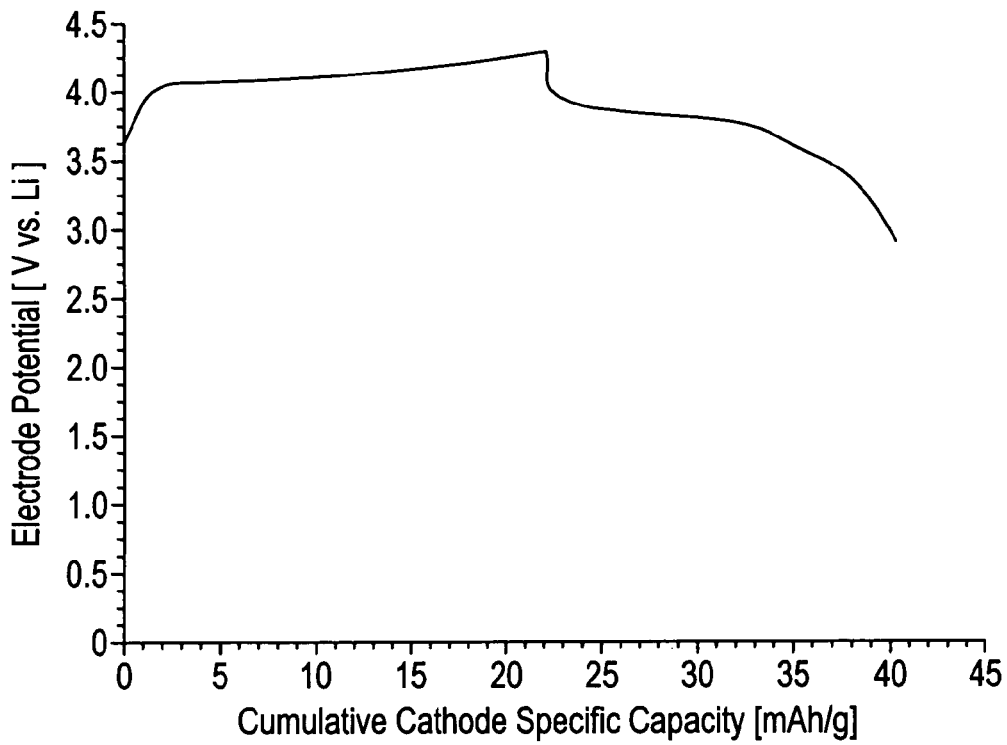
FIG. 5 shows the first cycle constant current data of the Li(VO)$_{0.75}$Mn$_{0.25}$PO$_4$ material of Example 2.

FIG. 5 shows the first cycle constant current data of the $Li(VO)_{0.75}Mn_{0.25}PO_4$ material of Example 2. The data were collected using a lithium metal counter electrode at an approximate C/10 rate between 3.00 and 4.30 V and are based upon 17.0 mg of the $Li(VO)_{0.75}Mn_{0.25}PO_4$ active material in the positive electrode. The testing was carried out at 23° C. The initial measured open circuit voltage (OCV) was approximately 3.50 V vs. Li. Lithium is extracted from the $Li(VO)_{0.75}Mn_{0.25}PO_4$ during charging of the cell. A charge equivalent to a material specific capacity of 22.1 mAh/g is extracted from the cell. When the cell is discharged to approximately 3.00 V a quantity of lithium is re-inserted into the $Li_{1-x}(VO)_{0.75}Mn_{0.25}PO_4$. The re-insertion process corresponds to 18.4 mAh/g, indicating the reversibility of the extraction-insertion processes. The generally symmetrical nature of the charge-discharge curves indicates the reversibility of the system.

Example 7

Electrochemical Characterization of $NaVOPO_4$

Figure 6:
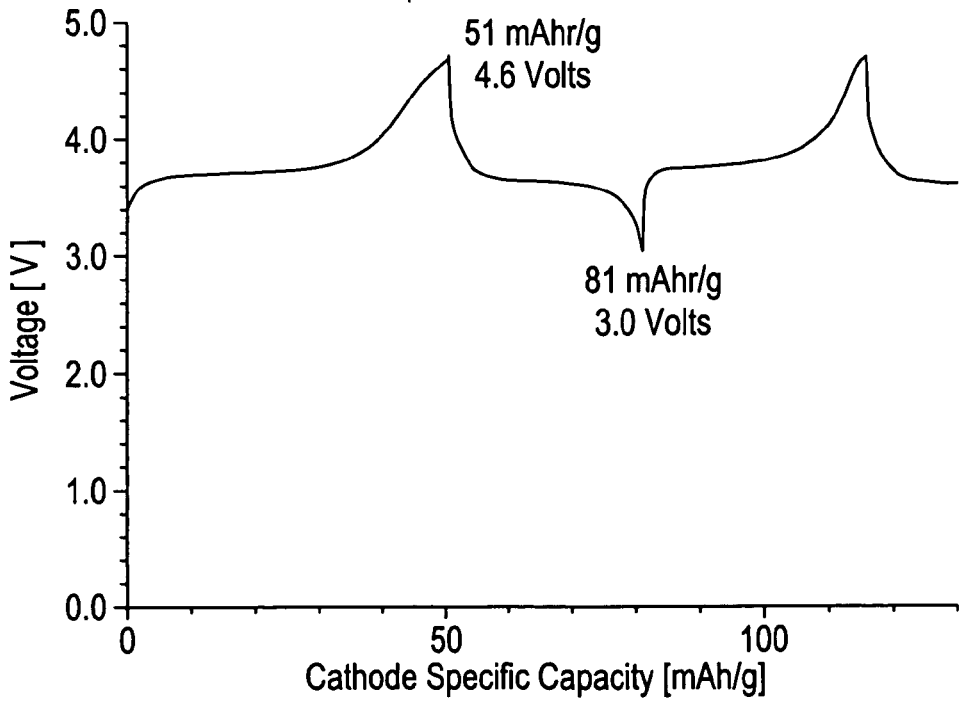
FIG. 6 shows the first cycle constant current data of NaVOPO$_4$ material made carbothermally at 600° C. for 30 minutes.

FIG. 6 shows the first cycle constant current data of the $NaVOPO_4$ material made carbothermally at 600° C. for 30 minutes (Example 3). The data were collected using a lithium metal counter electrode at an approximate C/10 rate between 3.00 and 4.60 V and are based upon 24.3 mg of the $NaVOPO_4$ active material in the positive electrode. The testing was carried out at 23° C. The initial measured open circuit voltage (OCV) was approximately 3.20 V vs. Li. It is assumed that sodium is extracted from the $NaVOPO_4$ during the first charging of the cell. A charge equivalent to a material specific capacity of 51 mAh/g is extracted from the cell. It is expected from thermodynamic considerations that the sodium extracted from the $NaVOPO_4$ material during the initial charging process would be displacement 'plated' onto the lithium metal anode. Therefore, during the subsequent discharging of the cell, it is assumed that lithium is re-inserted into the material. The re-insertion process corresponds to 30 mAh/g, indicating the reversibility of the extraction-insertion processes. The generally symmetrical nature of the charge-discharge curves further indicates the reversibility of the system.

Example 8

Figure 7:
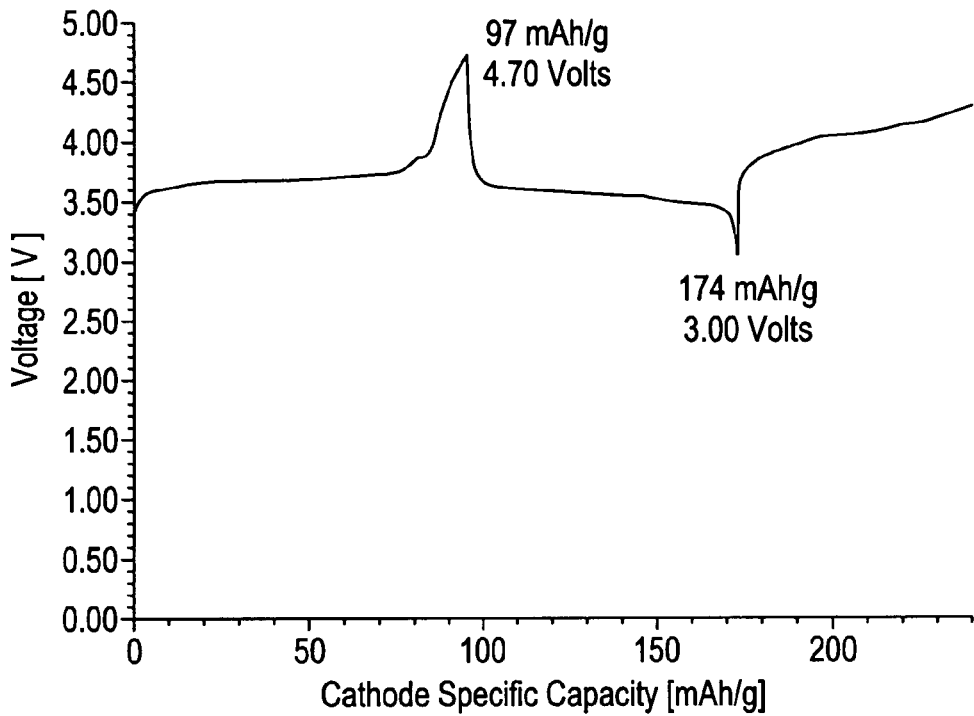
FIG. 7 shows the first cycle constant current data of the NaVOPO$_4$ material made carbothermally at 700° C. for 30 minutes.

FIG. 7 shows the first cycle constant current data of the $NaVOPO_4$ material made carbothermally at 700° C. for 30 minutes (Example 4). The data were collected using a lithium metal counter electrode at an approximate C/10 rate between 3.00 and 4.60 V and are based upon 24.3 mg of the NaVOPO$_4$ active material in the positive electrode. The testing was carried out at 23° C. The initial measured open circuit voltage (OCV) was approximately 3.25 V vs. Li. It is assumed that sodium is extracted from the NaVOPO$_4$ during the first charging of the cell. A charge equivalent to a material specific capacity of 97 mAh/g is extracted from the cell. It is expected from thermodynamic considerations that the sodium extracted from the NaVOPO$_4$ material during the initial charging process would be displacement 'plated' onto the lithium metal anode. Therefore, during the subsequent discharging of the cell, it is assumed that lithium is re-inserted into the material. The re-insertion process corresponds to 80 mAh/g, indicating the excellent reversibility of the extraction-insertion processes for this material. The generally symmetrical nature of the charge-discharge curves further indicates the excellent reversibility of the system. The improved test results for this material over the equivalent material made at 600° C. indicates the importance of the carbothermal preparative conditions.

Figure 8:
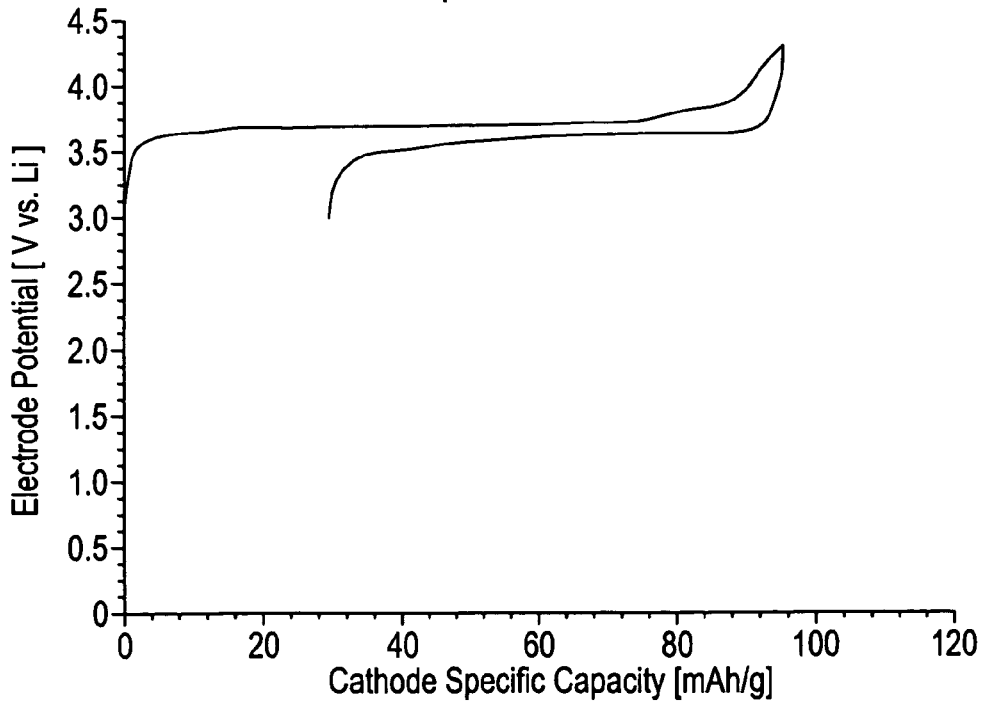
FIG. 8 shows the electrode potential versus specific capacity data for NaVOPO$_4$ when cycled between voltage limits of 3.00 and 4.30 V.
Figure 9:
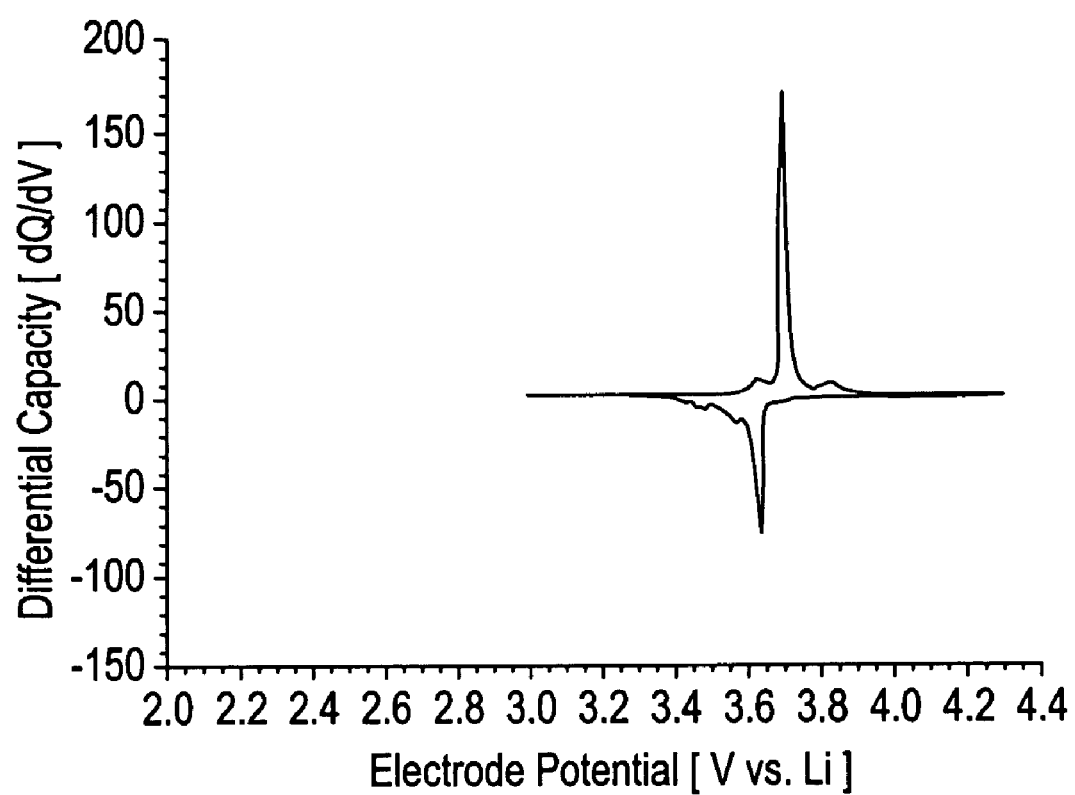
FIG. 9 shows the EVS differential capacity data of NaVOPO$_4$.

The NaVOPO$_4$ of Example 4 material was further subjected to high resolution electrochemical testing using the Electrochemical Voltage Spectroscopy (EVS) technique. FIG. 8 shows the electrode potential versus specific capacity data for this material when cycled between voltage limits of 3.00 and 4.30 V. The EVS test was carried out at an approximate C/10 rate. The weight of the active material was 17.1 mg and the test was carried out at 23° C. It is assumed that sodium is extracted from the NaVOPO$_4$ during the first charging of the cell. A charge equivalent to a material specific capacity of 95 mAh/g is extracted from the cell. The re-insertion process (lithium insertion) corresponds to approximately 66 mAh/g, indicating coulombic reversibility of the NaVOPO$_4$ material. FIG. 9, the EVS differential capacity data, further demonstrates the reversibility. The symmetrical nature of the main charge-discharge peak (3.70V on charge, 3.65V on discharge) indicates the electrochemical reversibility.

The invention has been described above with respect to preferred embodiments. The description is merely exemplary in nature and, thus, variations that do not depart from the gist of the invention are intended to be within its scope. Variations will be apparent to those who are skilled in the art and are also part of the invention. Such variations are not to be regarded as a departure from the spirit and scope of the invention, which is defined in the appended claims.

We claim:

1. A method for synthesizing active materials of general formula $$A_a(MO)_bM'_cXO_4$$

wherein X is selected from the group consisting of phosphorous, sulfur, arsenic and combinations thereof, A is an alkali metal or mixture of alkali metals, M is a transition metal or mixture of transition metals at least one of which is not in its highest oxidation state, M' comprises a metal, 0<b≦1 and 0<a<2, and 0≦c<1 where a, b, and c are selected to maintain the electroneutrality of the compound, the method comprising the steps of combining starting materials to form a mixture, wherein the starting materials comprise a metal compound of formula $(MO)_bM'_cXO_4$, wherein M and M' are the same elements as in the formula above for the active material, but wherein at least one of M and M' has a higher oxidation state than in the above formula for the active material, a source of reducing carbon, and a source of alkali metal A; and heating the mixture at a temperature about greater than 400° C. and for a time sufficient to form a reaction product wherein at least one of M or M' is reduced in oxidation state without full reduction to elemental state.

2. A method according to claim 1, wherein M comprises vanadium and M' comprises at least one element selected from the group consisting of chromium, iron, cobalt, nickel, molybdenum, manganese and vanadium.

3. A method according to claim 1, wherein A comprises sodium, lithium, or a mixture of lithium and sodium.

4. A method according to claim 1, wherein the material has general formula $$Li_a(VO)_bM'_cPO_4$$

wherein M' is selected from the group consisting of chromium, iron, cobalt, nickel, molybdenum, manganese and vanadium.

5. A method according to claim 1, wherein the reducing carbon is selected from the group consisting of elemental carbon, carbohydrates and sucrose.

6. A method according to claim 1, wherein the reducing carbon comprises an organic precursor material that decomposes during the heating step to form a carbonaceous material containing carbon in a form capable of acting as a reductant.

7. A method according to claim 1, wherein X comprises phosphorous.

8. A method according to claim 7, wherein the starting material metal compound has general formula $$(MO)_bM'_{1-b}PO_4$$

and is prepared by a process comprising:

reacting a source of phosphate with an M$^{5+}$ oxide and a source of M' in a chemical precipitation or reflux preparation route to form a reaction product.

* * * * *